2,948,622

PROCESS FOR PRODUCING COLD WATER-SOLUBLE GELATIN COMPOSITIONS

Frank J. Cahn, Los Angeles, Calif., assignor to Louis Milani Foods, Inc., Los Angeles, Calif., a corporation of Illinois No Drawing. Filed Mar. 10, 1959, Ser. No. 798,328

5 Claims. (Cl. 99—130)

The instant invention relates to an improved edible preparation containing gelatin which easily dissolves in cold water and sets to a clear transparent gel, and to methods of producing such compositions suitable for inclusion in powdered gelatin-containing desserts, salads, and the like.

Many powdered food products which contain gelatin, fruit flavoring, and artificial coloring are available to the public. They are widely used in preparing desserts, salads, and the like. The conventional commercially available gelatin-containing powders must be dissolved in hot water and the resulting hot solution must be cooled or refrigerated in order to set to a gel. Generally the dessert is not ready to be served for several hours.

The necessity of dissolving the gelatin-containing powder in hot water results in a loss of volatile fruit flavor and aroma. This loss of flavor and aroma could be minimized and a more appetizing product obtained if the gelatin powder were soluble in cold water. In addition, an initially cold solution would gel in substantially less time than required for cooling and gelation of a hot solution containing a conventional powder.

For these reasons gelatin-containing powders which are soluble in cold water would have substantial advantages over the present conventional powders, and have long been sought after.

Gelatin products which are said to dissolve in cold water are disclosed in U.S. Patent 2,166,074 issued to Reichel. The product is a porous friable mass obtained by freezing an aqueous solution of gelatin and subliming ice from the frozen material under an almost perfect vacuum and at a very low temperature. This product is not available commercially and the process is deemed not to be economically feasible.

U.S. Patent 2,803,548 issued to E. B. Hagerty describes and claims a method for producing gelatin-containing preparations which are soluble in cold water. This product is obtained by evaporating water from a gelatin-containing solution at a pressure of 50–100 mm. of Hg and at temperatures between 37° C. and 70° C. Another patent, U.S. 2,841,498 issued to Cahn and Hagerty claims a method for producing a spray dried gelatin powder at a pressure of 225 pounds per square inch and at a temperature of 124° C. to 243° C.

It is an object of the instant invention to provide a simplified commercially feasible method for producing gelatin-containing preparations which are soluble in cold water.

It is a further object of the instant invention to provide a novel method for production of a cold water-soluble gelatin preparation by drying a gelatin-containing composition as a thin film.

It is a further object of the instant invention to provide a gelatin-containing preparation, soluble in cold water, which forms a clear transparent gel.

These and other objects of the instant invention will become more apparent from the following description and claims.

I have discovered that a hot solution comprising about one part gelatin, nine parts sugar, and ten parts water can be dried as a thin film, and the dried product is soluble in cold tap water. This result is unexpected because it is in contradistinction to the observation that a suspension of one part gelatin in any amount of water containing nine parts of sugar becomes soluble only when heated.

In one embodiment of the invention an ungelled warm liquid gelatin dessert solution of about 50% solids content—that is containing about one part gelatin, nine parts sugar, and ten parts water—was smeared on a flat glass slide in thickness between about 0.004 cm. and about 0.006 cm. The material was dried at about 100° C. for about three minutes. The resulting dried mixture was scraped off the slide and dissolved with cold water to obtain a 12½° refractometer Brix solid solution. Upon standing ¾ hour at a temperature of about 10° C. this solution gelled.

In practicing the instant invention, the hot aqueous solution containing sugar and gelatin in about the proportions of 9 to 1 can be roller dried, for example with a Buflovac drum drier of the atmospheric type. The roll in addition to being heated from the inside can be made more efficient by passing hot dry air over the outside of it. The resulting dried product is scraped off the rollers and is cold water-soluble.

For the instant process, aqueous solutions of gelatin and sugar material are suitable. The sugar materials include sucrose, dextrose, corn syrup solids, mixtures of these, and materials containing a large proportion of these.

The ratio of sugar to gelatin in the hot aqueous solution may range between 8 to 1 and 10 to 1, with a ratio of 9 to 1 being preferred. The quantity of hot water employed is sufficient to dissolve the gelatin and sugar. The solids content of the warm solution is generally between about 45% and about 55% by weight.

Small amounts of edible acid, such as tartaric acid, citric acid, and the like or mixtures thereof, which impart tart flavor to the product, as well as stable artificial fruit flavoring and artificial coloring can be mixed with the aqueous gelatin-sugar solution. So-called buffers like sodium citrate, disodium tartrate, sodium gluconate and mixtures of any two or more of them, are also frequently included in the aqueous solution. However, the fugitive volatile flavoring materials commonly used for imparting fruit flavor to gelatin products should be mixed with the dried pulverized product after it has cooled. If desired, granulated sugar material is also added to the dried product. The amounts of these materials depend upon the particular flavor and color desired in the product and is purely a matter of choice.

The film generally of thickness between about 0.004 cm. and about 0.03 cm. of the solution of gelatin and sugar is rapidly evaporated to dryness, at a temperature between about 70° C. and about 120° C., and at about atmospheric pressure. However a subatmospheric pressure, as low as about ¾ atmosphere can also be employed. The drying generally takes between about three and about ten minutes depending upon the thickness of the film.

The resulting dried material, which is collected or scraped from the rollers or other drying surface is pulverized if necessary, mixed with any additional desired ingredients, and packaged. The power obtained is soluble in the conventional amount of water used for dissolving gelatin-containing dessert powders.

The instant product dissolves in ordinary cold tap water, thereby eliminating the step of heating water for dissolving the gelatin, and providing a product retaining its original fruit aroma and flavor. In addition, the resulting gel is ready for serving sooner than conventional ones because the necessity for cooling a hot solution of the dissolved gelatin is eliminated.

The instant novel process is much more feasible for commercial operations than earlier processes described in the art for preparing cold water-soluble gelatin powders. Unlike the earlier methods, relatively simple, easy to control, equipment is used; and the drying can be carried out at atmospheric pressure as well as at subatmospheric pressures.

The following examples are given for the purposes of illustration, but there is no intention that the invention be limited thereto.

*Example I*

One part of dry commercial gelatin is mixed with nine parts granulated cane sugar, and ten parts water is added to the mixture. The suspension was heated until a homogeneous solution resulted. The resulting mixture was smeared on a glass slide as a film of about 0.004 cm. thickness and dried in an oven at about 100° C. The drying took about three minutes. The dry material was scraped off the slide and pulverized. The resulting cool product is mixed with any desired conventional food coloring, flavoring, additional sugar, edible food acids, buffers, and conventional dessert and pudding ingredients.

When the product was mixed with 7 parts cool tap water, it dissolved readily and upon being cooled it set to a fine, firm gel. The resulting gel has the appearance, gel strength, and eating properties of conventional gelatin dessert.

*Example II*

An ungelled warm fluid solution of gelatin dessert ingredients of 50% solids content, containing about 8.8 parts of sucrose, 0.175 part citric acid, 1 part gelatin of 225 bloom strength, and 10 parts of water was distributed uniformly on a flat glass plate so as to have a thickness of about 0.026 cm., and was dried at about 100° C. for 7 minutes. The resulting dried brittle material was scraped off the plate and dissolved in cold water to obtain a 17% refractometer Brix solution. Upon standing for ¾ hour at a temperature of about 10° C. this solution gelled to the consistency of a conventional gelatin dessert.

*Example III*

When the procedure described in Example I and II is repeated using a Buflovac drum drier of the atmospheric type on which to dry the film, gelatin-containing powders having the same characteristics as that described in these examples are obtained.

Having thus fully described and illustrated the character of the instant invention, what is desired protected by Letters Patent is:

1. In a process for producing gelatin-containing powder which dissolves in cold water and is capable of setting to a transparent gel, the step which consists in rapidly converting a fluid, ungelled film which is between 0.004 cm. and 0.03 cm. in thickness and which consists essentially of a solution of 1 part gelatin and between about 8 and about 10 parts sugar material in 10 parts water, into dry brittle solid material, by removing moisture from said fluid film while it is exposed to the atmosphere.

2. The process of claim 1 wherein sucrose is the sole sugar material.

3. The process of claim 1 wherein a buffering substance from the group consisting of sodium citrate, disodium tartrate, sodium gluconate, and mixtures of any two or more of them, is included in the film to be dried.

4. A process for the production of an edible gelatin-containing powder which readily dissolves in cold water to form a solution which sets to a transparent gel, comprising: drying at temperatures between about 70° C. and about 100° C. at a pressure between about ¾ atmosphere and about one atmosphere, a thin ungelled film of a solution consisting essentially of about 9 parts sucrose, 1 part gelatin, and 10 parts water, said film having a thickness between 0.004 cm. and about 0.03 cm., and pulverizing the resulting dried product.

5. The process for the production of gelatin-containing powder which readily dissolves in cold water and is capable of setting to a transparent gel, comprising: applying to a surface an ungelled solution consisting essentially of 1 part gelatin, between 8 and 10 parts sugar material, and 10 parts water, to form a fluid film between 0.004 cm. and 0.03 cm. in thickness, heating said film to temperatures between 70° C. and 100° C. while exposed to the atmosphere to convert the same to sensibly dry material, scraping said dried material from said surface, and pulverizing it.

References Cited in the file of this patent

UNITED STATES PATENTS

| | | |
|---|---|---|
| 2,196,146 | Collins | Apr. 2, 1940 |
| 2,346,880 | Urbain | Apr. 18, 1944 |
| 2,803,548 | Hagerty | Aug. 20, 1957 |